Patented Jan. 17, 1933

1,894,889

UNITED STATES PATENT OFFICE

EARL B. PUTT, OF NEW YORK, N. Y.

PHENOLPHTHALEIN COMPOSITION AND PROCESS OF MAKING SAME

No Drawing.    Application filed November 19, 1926.    Serial No. 149,530.

This invention appertains to phenolphthalein and processes of making the same, and more particularly to a novel finely divided phenolphthalein and to phenolphthalein like products.

This application is in part a division of my copending application Serial No. 108,418, filed May 11th, 1926, for finely divided phenolphthalein and process of making the same.

In my prior Patent No. 1,574,934, granted March 2nd, 1926, I described and claimed a bulky, quickly soluble form of phenolphthalein and processes of making the same. The present invention relates to an improvement upon an addition to the subject matter of said patent.

An object of the present invention is to produce phenolphthalein in a crystalline condition even more finely divided than in the amorphous product described in my patent above referred to, by precipitating phenolphthalein from solution under carefully regulated conditions.

Another object of this invention is to produce a phenolphthalein product containing pure phenolphthalein and products or derivatives of the reagents employed in the preparation of phenolphthalein, such products or derivatives being phenol and phthalic acid radical containing compounds.

The usual method of producing a finely crystallized phenolphthalein is by the well known procedure of rapid deposition from a saturated solution in certain organic solvents such as alcohol, acetone, amyl alcohol, etc., either by evaporation, supersaturation, or dilution with a liquid in which the phenolphthalein is comparatively insoluble such as benzol or water. Such crystals, though fine enough to pass through even a three hundred mesh sieve in some cases, are still relatively very large as compared with material yielded by my present process. For example, such a three hundred mesh crystal has a diameter of about 80 microns, whereas my new product is made up of particles having a diameter averaging 6 microns for the crystalline and of submicroscopic size for the colloidal particles.

For the production of the finely divided crystalline form the following procedure is a typical illustration of my process:

100 grams of phenolphthalein is dissolved in 200 cc. of water containing 50 cc. of 50 per cent. sodium hydroxide solution, keeping the mixture cooled by suitable means to 20° C. After the solution is complete it is diluted with 2000 cc. of water containing in solution 100 grams of acacia (gum arabic) or other colloidal material preferably a solution of a gum such as Indian gum, tragacanth or agar-agar, in an amount which yields a solution or suspension having the viscosity of the 5 per cent. acacia solution mentioned. To this solution, after filtration if necessary, add an excess of 50 per cent. acetic acid, rapidly and with vigorous stirring. As the alkaline phenolphthalein solution is neutralized, the red color disappears, but if the addition of the acetic acid has been properly regulated, there is a distinct time interval before the phenolphthalein starts to precipitate, even though the solution is quite acid. The liquid is clear for as much as several seconds, when suddenly the phenolphthalein separates out from solution in a dense white precipitate, which when viewed under the microscope is very finely divided and minutely crystalline. Allow the mixture to stand over night, filter, wash with water until free from impurities, and dry in the usual manner. The novelty in this reaction lies in the formation of a colloidal solution of phenolphthalein from which minute crystals form on standing. The amount of protective colloid, in this instance gum, is not sufficient to yield a permanent colloidal solution but is enough to retard precipitation until crystallization can take place. The use of a considerable excess of acetic acid, rapidly added in concentrated form aids in the formation of this colloidal phase.

A stream of carbon dioxide may be substituted for the acetic acid if the action is carried on rapidly. Also, mineral and other organic acids than the acetic acid mentioned may be employed if the concentration is kept sufficiently low to avoid sudden precipitation of large masses of the phenolphthalein product.

While the phenolphthalein produced in the manner described above is in extremely finely divided form and is entirely satisfactory for most purposes to which the product may be put, I have discovered that a more finely divided product and one which is even more active as a laxative is produced if a solution of one or more of the derivatives of the reagents employed in the preparation of phenolphthalein is mixed with a solution of the pure phenolphthalein prepared as above described and the resulting solution precipitated with a suitable reagent.

In the preferred practice of preparing this improved product finely divided pure phenolphthalein, preferably prepared in the manner described above, is dissolved in a suitable solvent, such as sodium hydroxide. A separate solution of one or more of the products or derivatives of the reagents employed in the preparation of phenolphthalein such products or derivatives being phenol and phthalic acid radical containing compounds other than true phenolphthalein is mixed with the solution of pure phenolphthalein. These products are compounds or derivatives of phenol and phthalic anhydride or phthalic acid and may include any or all of the following compounds: alpha- and beta-hydroxy-anthraquinone, fluorane, iso-phenolphthalein, hydroxy-benzoyl-benzoic acids or the combination of any of these with the original components of the phenolphthalein condensation reaction or with each other. In preparing these solutions the first should contain a definite weight of the white U. S. P. phenolphthalein and the second should contain a definite weight of the phenol and phthalic acid radical containing compounds in order that a definite known amount of U. S. P. phenolphthalein will be contained in each grain of the finished product.

The mixture of solutions thus prepared may be precipitated with an acid, preferably acetic acid, in substantially the same manner as that employed for precipitating pure phenolphthalein but the step of adding a solution of protective colloid may be omitted if desired without materially detrimentally affecting the final product.

The crude phenolphthalein product now known as "yellow phenolphthalein", although it is known to be more laxative than pure white phenolphthalein, is an indefinite mixture of phenolphthalein and impurities or by-products produced in the manufacture of phenolphthalein and for this reason its use for certain purposes is objectionable. Since the name "phenolphthalein" is properly applied, according to the U. S. Bureau of Chemistry, only to pure U. S. P. phenolphthalein, it is impossible to state the percentage of pure U. S. P. phenolphthalein in a given dosage of such yellow phenolphthalein since, in fact, it contains none, as the phenolphthalein contained therein has not been separated from its impurities or by-products and purified up to U. S. P. quality. My product, on the other hand, contains in each grain of finished product a definite amount, e. g. 95% to 99% of actual U. S. P. phenolphthalein, so that in declaring the phenolphthalein content of a preparation made from my product for laxative or other purposes, it is possible and proper to declare the presence of phenolphthalein U. S. P. in a certain dosage, for the reason that such pure U. S. P. phenolphthalein actually entered into the article.

While I have referred to employing the phenol and phthalic acid radical containing compounds produced or derived from the reagents employed in the production of crude phenolphthalein, it is to be understood that any or all of these products may be prepared separately by other means and from other raw materials and employed with the pure phenolphthalein, preferably my improved phenolphthalein hereinbefore described.

While I have described in detail the preferred practice of my process and the products resulting therefrom, it is to be understood that the details of procedure and proportions of ingredients may be widely varied without departing from the spirit of the invention or the scope of the subjoined claims.

I claim:

1. The composition comprising finely divided crystalline phenolphthalein the major portion of which is made up of unground crystals of less than ten microns in diameter.

2. The composition comprising pure, finely divided crystalline phenolphthalein a major portion of which is made up of unground crystals of less than ten microns in diameter associated with other phenol and phthalic acid radical containing compounds.

3. A composition adapted for use as a laxative comprising a definite, known major proportion of pure, finely divided crystalline phenolphthalein made up of unground crystals of less than ten microns in diameter associated with a minor proportion of other phenol- and phthalic acid radical containing compounds.

4. The process which comprises first forming an alkaline solution of pure phenolphthalein, mixing water containing a solution of a protective colloid therewith while cool, mixing an alkaline solution of other phenol- and phthalic acid radical containing compounds therewith, and rapidly adding thereto an acid selected from the group comprising acetic acid, carbonic acid and acids of low concentration.

5. The process which comprises first forming an alkaline solution of pure phenolphthalein, mixing water containing a solution of acacia therewith while cool, mixing an alkaline solution of other phenol- and phthalic acid radical containing compounds therewith, and rapidly adding thereto an acid selected from the group comprising acetic acid, carbonic acid and acids of low concentration.

6. The process of preparing finely divided crystalline phenolphthalein which comprises precipitating an alkaline solution of phenolphthalein in the presence of a colloid sufficient to delay precipitation but insufficient to form a thick gel on standing by the rapid addition of an acid selected from the group comprising acetic acid, carbonic acid, and acids of low concentration.

7. The process of preparing finely divided crystalline phenolphthalein which comprises precipitating an alkaline solution of phenolphthalein by rapidly adding acetic acid in the presence of a colloid sufficient in amount to delay precipitation but insufficient to form a thick gel on standing.

8. The process which comprises rapidly adding acetic acid to an alkaline aqueous solution comprising pure phenolphthalein, other phenol- and phthalic acid radical containing compounds, and a protective colloid.

9. The process which comprises rapidly adding acetic acid to an alkaline aqueous solution comprising pure phenolphthalein, other phenol- and phthalic acid radical containing compounds, and acacia.

10. The process which comprises precipitating an alkaline solution of phenolphthalein by rapidly adding an acid of low concentration in the presence of an aqueous solution of acacia in an amount sufficient to delay precipitation but insufficient to form a thick gel on standing.

11. The process of preparing finely divided crystalline phenolphthalein which comprises rapidly adding a weak organic acid substantially free from mineral acids to an alkaline solution containing phenolphthalein and other phenol- and phthalic acid radical containing compounds.

12. The process of preparing finely divided crystalline phenolphthalein which comprises rapidly adding acetic acid to an alkaline solution containing phenolphthalein and other phenol- and phthalic acid radical containing compounds.

I testimony whereof I affix my signature.

EARL B. PUTT.